H. T. LEE.
CASTER FOR TRUNKS.
No. 44,689. Patented Oct. 11, 1864.
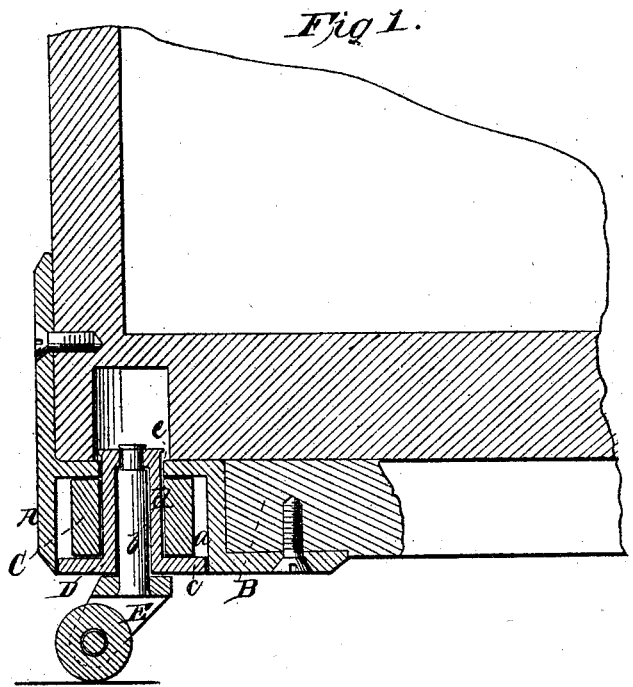
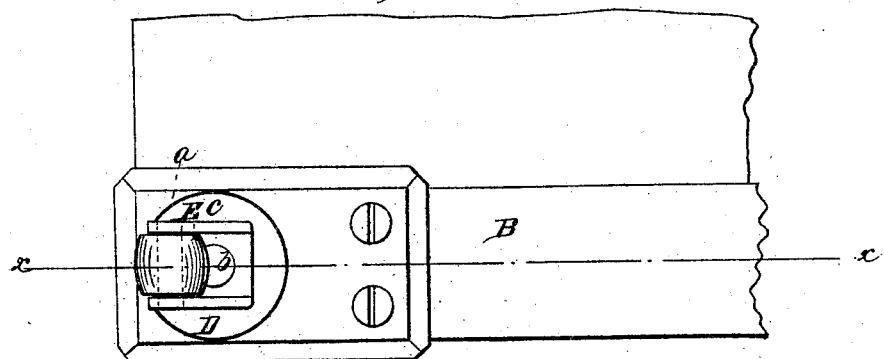
Witnesses.
Wm. F. McNamera
J. P. Hall
Inventor
Henry T. Lee

UNITED STATES PATENT OFFICE.

HENRY T. LEE, OF JERSEY CITY, NEW JERSEY, ASSIGNOR TO HIMSELF AND DAVID FROST, OF SAME PLACE.

IMPROVED CASTER FOR TRUNKS.

Specification forming part of Letters Patent No. 44,689, dated October 11, 1864.

*To all whom it may concern:*

Be it known that I, HENRY T. LEE, of Jersey City, in the county of Hudson and State of New Jersey, have invented a new and Improved Caster for Trunks, &c.; and I do hereby declare that the following is a full, clear, and exact description thereof, which will enable those skilled in the art to make and use the same, reference being had to the accompanying drawings, forming part of this specification, in which—

Figure 1 represents a longitudinal vertical section of this invention, taken in the plane indicated by the line $x\ x$, Fig. 2. Fig. 2 is an inverted plan of the same.

Similar letters of reference indicate corresponding parts.

This invention consists in combining with the shank of the caster, with the spring and protecting-cap, a flanged socket in such a manner that when the caster is subjected to a certain pressure the spring is compressed between the flange of the socket and the top of a cavity in the cap, and the caster turns or revolves on its shank with the same facility under pressure as it does when it is relieved.

A represents a cap made to fit the corner of a trunk or of any other article to which a caster may be applied. When applied to a trunk, this cap is made to fit over the bar B, and it is fastened to the same and to the side of the trunk by suitable screws. Said cap is provided with a cavity, $a$, to receive the spring C and the flanged socket D, which forms the guide for the shank $b$ of the caster E. The flange $c$ of the socket D fits nicely into the cavity $a$, so that it can revolve in the same or move up and down with perfect freedom. From this flange rises the tubular projection $d$, which passes up through a hole in the top of the cavity $a$, as clearly shown in Fig. 1 of the drawings, and which is so fitted that it rotates in said hole or moves up and down in the same without binding. The socket D is bored out to receive the shank $b$ of the caster, and a shoulder, $f$, in the upper end of the socket, bears against a corresponding shoulder on the shank and forms the bearing-surface on which the caster revolves when it is subjected to a certain pressure. The top end of the shank is spread over the edge of the hole in the socket to prevent it from dropping out accidentally, and in the same manner the top end of the tubular projection $d$ of this socket is spread after the same has been passed through the hole $e$, so that said socket is free to rotate, but prevented from coming out spontaneously. The caster E itself is made in the usual manner and of any suitable size for the occasion. When it is applied to a trunk and the trunk is thrown down, the springs of the caster relieve the body of the same of the principal strain, and the casters themselves, being free to turn in either direction, whether exposed to a downward pressure or not, accommodate themselves readily to the direction which the trunk is to move, or does move, and are prevented from being knocked off accidentally if the trunk is thrown down hard. The spring, which is made of india-rubber or other suitable material, is compressed between the flanged socket and the top of the cavity in the cap, and the shank of the caster turns with equal facility, or nearly so, whether exposed to pressure or not.

I claim as new and desire to secure by Letters Patent—

The flanged socket D, in combination with the caster E, spring C, and cap A, constructed and operating in the manner and for the purpose substantially as set forth.

HENRY T. LEE.

Witnesses:
WM. F. MCNAMARA,
M. M. LIVINGSTON.